(12) United States Patent
Shooks, Jr. et al.

(10) Patent No.: US 6,930,820 B1
(45) Date of Patent: Aug. 16, 2005

(54) EMBEDDED FIBER OPTIC DEMODULATOR

(75) Inventors: Wesley Raymond Shooks, Jr., St. Charles, MO (US); James P. Dunne, Ballwin, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/828,675

(22) Filed: Apr. 21, 2004

(51) Int. Cl.[7] .............................. G02F 2/00; B32B 9/04; G02B 6/26

(52) U.S. Cl. .................... 359/325; 385/12; 428/292.1; 428/411.1

(58) Field of Search .......................... 385/12–15, 147; 359/325; 428/292.1, 293.1, 293.4, 294.7, 428/295.1, 297.4, 411.1

(56) References Cited

U.S. PATENT DOCUMENTS

| | | | |
|---|---|---|---|
| 4,471,659 A | 9/1984 | Udd et al. | |
| 4,668,093 A | 5/1987 | Cahill | |
| 5,380,995 A | 1/1995 | Udd et al. | |
| 5,563,967 A | 10/1996 | Haake | |
| 5,627,927 A | 5/1997 | Udd | |
| 5,633,748 A * | 5/1997 | Perez et al. .................. | 359/325 |
| 6,204,920 B1 | 3/2001 | Ellerbrock et al. | |

OTHER PUBLICATIONS

University of Minnesota; *Wideband Integrated Acoustic Emission Microsensors*l; Paper, undated.

The Boeing Company; *Enhancements to Fiber Optic Bragg Grating Sensors and Demodulation Systems*; article; published by The Boeing Company, St. Louis, MO; printed Jul. 21, 2004.
Axsun Technologies; *Optical Monitor Product Family*; Product Description; Axsun Technologies, Billerica, MA 01821.
Fiber Optic Sensors and Sensing Systems Inc., *Company Pamphlet*; Belgium.
Axsun Technologies; *SpectralEye Interrogator Family*; Performance specifications for SpectralEye Models; Copyright 2004.
Borkar, Shekhar Y.; *Silicon Photonics: New Opportunities for Silicon*; Intel DeveloperUPDATE Magazine; Apr. 2002, pp. 1-5.
INTEL; *Fiber Optic Speeds with Silicon Efficiencies*; www.intel.com/labs/sp/indesx.htm; Apr. 1, 2004; pp. 1-3.

* cited by examiner

*Primary Examiner*—John D. Lee
(74) *Attorney, Agent, or Firm*—Thompson Coburn LLP

(57) ABSTRACT

A composite material is provided that includes laminated layers, an optical fiber, and a demodulator. The layers define a surface portion generally parallel to the layers and an edge portion generally perpendicular to the layers. The optical fiber and demodulator are embedded in the material. The demodulator is optically coupled to the optical fiber and demodulates light transmitted through the optical fiber. A method of monitoring the health of a structural member, which includes a composite material having an optical fiber, is also provided. The method includes demodulating light from the optical fiber using a demodulator embedded in the composite material. Also, a signal representative of the demodulated light is received and interpreted as a condition of the composite material.

25 Claims, 3 Drawing Sheets

EMBEDDED FIBER OPTIC DEMODULATOR

FIELD OF THE INVENTION

This invention relates generally to fiber optic demodulators and, more particularly, to fiber optic demodulators used in structural health monitoring applications.

BACKGROUND OF THE INVENTION

Optical fibers embedded in composite structural members hold promise for use as structural health monitoring sensors. Current technology employs a combination of an external light source, and an external demodulator, and a protective cable extension that is optically coupled to an optical fiber where the fiber exits the composite member. The external transmitters transmit electromagnetic radiation (hereinafter "light") into the cables wherein the light encounters optical fiber sensors that cause sensible alterations to the transmitted light. The alterations may be linear (i.e. characterized by the same frequency of the transmitted light) or non-linear and are generally proportional, in some manner, to the condition the sensors are intended to measure. Thereafter, the altered light travels through the cables and reaches the external demodulators. The demodulator then converts (i.e. demodulates) the altered light to an electrical signal representative of the sensed condition.

Because the transmitters and demodulators discussed above are external to the composite members, the optical fiber must extend from the member, thereby presenting several problems. For instance, the external portion of the optical fibers are fragile and exposed to mechanical abuse. Thus, additional structural elements must be added to support and protect the external portion of the optical cables. Also, the egress of the cables from the composite members complicates the tooling (particularly the bonding jig) required for fabrication of the members. Further, during fabrication and assembly of the composite members into larger assemblies, the exposed optical cables necessitate careful handling. For these reasons a need exists to improve fiber optic structural health monitoring ("SHM") systems.

SUMMARY OF THE INVENTION

It is in view of the above problems that the present invention was developed. The invention provides apparatus and methods for monitoring the health of composite structural members.

In a preferred embodiment, the present invention provides a composite material that includes laminated layers, an optical fiber, and a demodulator. The layers define a surface portion generally parallel to the layers and an edge portion generally perpendicular to the layers. The optical fiber and demodulator are embedded in the material. The demodulator is optically coupled to the optical fiber and demodulates light transmitted through the fiber. Thus, the composite materials provided by the present invention may be employed on mobile platforms (e.g. aircraft) to enhance the SHM capabilities of the platforms. In particular, embedding the demodulator in the composite material, along with the optical fiber, enables reliable "on demand" interrogation of the SHM sensors which are integral with the optical fiber embedded in the composite material.

Preferably, the demodulator communicates a signal representing the demodulated light via an electromagnetic (hereinafter radio frequency or RF) transmitter or a conductive path through the composite material. Also, the demodulator may be inductively powered by electromagnetic energy (hereinafter RF energy) transmitted into the composite material or powered via a hard-wired connector. Further preferred embodiments include programmable embedded demodulators so that the operation of the demodulators can be changed to accommodate varying circumstances. Moreover, the demodulators, and associated electronics, may be encapsulated in an electrical insulator and configured to fit within envelopes of about 0.03 inches by 0.50 inches by 0.50 inches, or less. Also, to assure compatibility with the mechanical properties of the composite members, the encapsulator may have coefficients of thermal expansion (CTE) approximately equal to the CTE of the composite materials. Likewise, encapsulators having surfaces that adhere to the matrix of the composite materials are provided by other preferred embodiments.

Additionally, a fiber optic system embedded in a composite material may include an analog to digital converter for digitizing the signal. The optical fiber also includes multiple sensors incorporated on the optical fiber for sensing conditions of the composite material. The sensed conditions include (but are not limited to) acoustic emissions, strains, pressures, temperatures, and response frequencies, which in turn provide information about the health of the structure and the state of the composite's matrix (during formation or curing). Optionally, the optical fiber may include a cladding. Moreover, the preferred embodiments may be embedded in either generally planar or filament wound composite materials.

In another preferred embodiment, the present invention provides a method of monitoring the health of a composite structural member that includes an optical fiber. The method includes demodulating light from the optical fiber using a demodulator embedded in the composite material. Also, a signal representative of the demodulated light is received and interpreted as a condition of the composite material. Preferably, receiving the demodulated signal includes either electrically conducting the signal or using an antenna. Further, the demodulated signal may then be used to determine whether to continue to monitor, repair, or replace the member based on the condition. The method may also include reprogramming the demodulator to account for the condition. For instance, if the structural member has been damaged, the condition is likely to be a discontinuity in the fiber that requires re-programming the demodulator to account for the disrupted fiber. In still another preferred embodiment, the demodulator may be inductively powered using electromagnetic (e.g. RF) energy.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
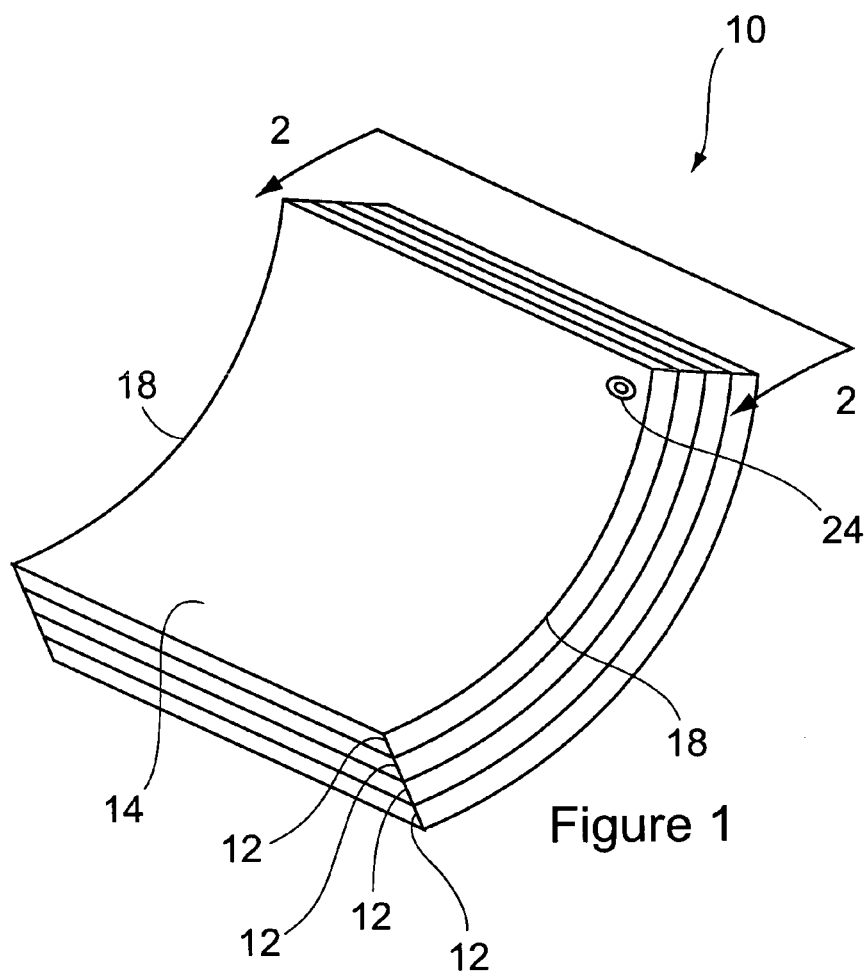
FIG. 1 illustrates a structural member constructed in accordance with a preferred embodiment of the present invention.

Referring to the accompanying drawings in which like reference numbers indicate like elements, FIG. 1 illustrates a composite structural member constructed in accordance with the present invention. The composite member 10 shown is generally planar, although curvilinear and spiral-wound members 10 are within the scope of the present invention. Likewise, injection molded, roto molded materials, and similar non-metallic materials are within the scope of the present invention. As shown, the member 10 is generally composed of layers 12 of material (e.g. carbon fiber tows) built upon each other and infused with a matrix binder. Typically, the member 10 includes a tool side (unfinished) surface 14, a finished surface 16 (see FIG. 2), and a plurality of edges 18. The layers 12 are usually trimmed along the edges 18 to allow the member 10 to be placed edge-to-edge with other members to form a larger structure (e.g. an aircraft skin). Because of their unique combination of lightweight and high strength, composite members 10 are found in a wide variety of applications. These exemplary applications include use as body panels and structural elements in mobile platforms such as aircraft.

Figure 2:
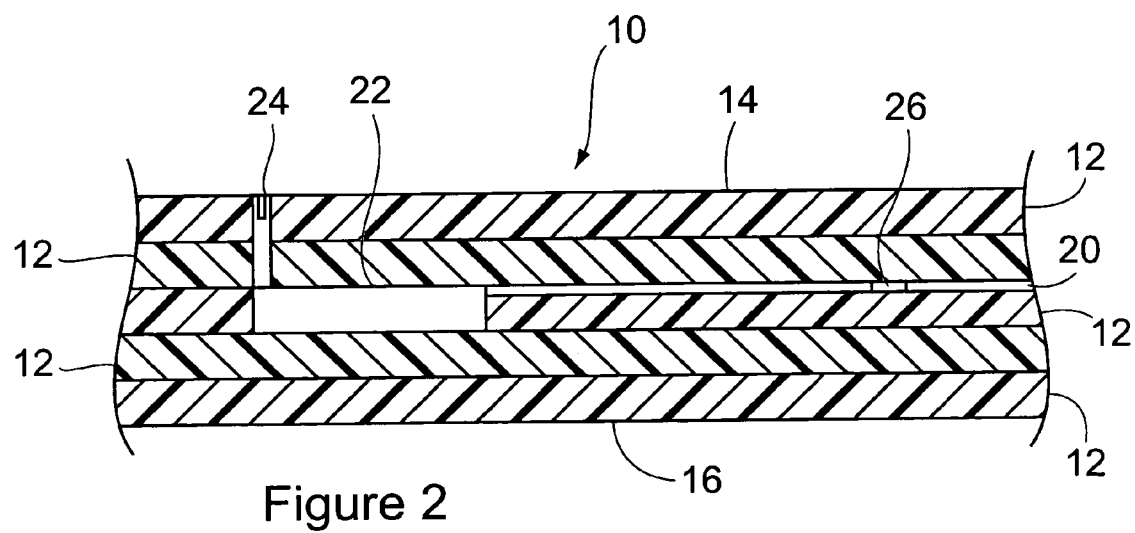
FIG. 2 illustrates a cross section view of the structural member of FIG. 1 taken along the line 2—2.

With reference now to FIG. 2, the member 10 is shown in cross section. In particular an optical fiber 20, a fiber optic demodulator 22, a conductive path 24, and a fiber optic sensor 26 (typically formed within or associated with the fiber 20) are illustrated. The optical fiber 20 and demodulator 22 are inserted in the laminate during fabrication thereof and thus lie within the plane of one of the layers 12. Generally, the fibers of the optical fibers 20 are on the order of 125 microns or smaller in diameter, whereas the tows (bundles of structural fibers) are on the order of 3 to $6\times10^{-3}$ inches (3 to 6 thousandths of an inch) in diameter. The tows are aligned, or woven, in layers generally about twice the thickness of the tows. Thus, the optical fiber 20 may run generally parallel, or generally orthogonal (e.g. across the layers or through the layers), to the orientation of the structural fibers, or warp, of the woven material 12 without causing significant distortion thereof. Because preferred optical fibers 20 are completely embedded in the composite material, and therefore protected from the environment as shown in FIG. 2, the optical fibers do not require a protective cable or jacket. The demodulator 22 lies within a window formed in one, or more, layers 12 and preferentially has a height equal to a whole number multiple of the height of the layers 12. Therefore neither the fiber 20 nor the demodulator 22 distorts the plies of the composite material. In yet another preferred embodiment, the demodulator 22 is miniaturized by the removal of all devices, structures, components, and assemblies other than those necessary to convert the light from the cable to an electric or RF signal suitable for further signal conditioning and amplification (external to the composite member). In another preferred embodiment the demodulator 22 resides within a package that is about 0.03 inches by about 0.50 inches by about 0.05 inches or smaller. It is also preferred to package the demodulator 22 such that it has a coefficient of thermal expansion (CTE) of about four ten millionths of an inch-per-inch to approximately match the CTE of many composite materials. Thus little, if any, thermal stress will occur between the demodulator 22 and the composite material. Additionally, the surface material of the demodulator 22 encapsulator may be chosen to adhere to the composite material to prevent delamination there between. The encapsulator may serve as an electrical insulator from the composite material for the demodulator 22 to enhance the functioning of the demodulator 22 and protect it from induced current during lightning strikes. Preferably, the encapsulator seals the demodulator sufficiently to preclude matrix intrusion during the laminate cure. The demodulator 22 may contain a fiber optic transmitter or may rely on light transmitted through the fiber 20 from a suitably-packaged and embedded fiber optic transmitter at the other end of the fiber 20. The conductive path 24, or member, shown connects to the output of the demodulator 22 and carries the electric signal to the unfinished surface 14. In yet another preferred embodiment, the optical fiber 20 and demodulator 22 are embedded in the outer-most layer of the composite.

Thus, in operation light being transmitted into the fiber 20 encounters the sensor 26 and is altered as a result of the conditioned being sensed. The altered light propagates back to the demodulator 24, which converts the altered light to an electric signal. The conductive member 24 communicates the signal to the unfinished surface 24 where it can be accessed by an operator with appropriate ground support equipment or by an onboard system. Thus, the sensor 26 may be interrogated "on demand" without the necessity of heavy protective cables to transmit the signal to a remote demodulator. Importantly, the present invention eliminates the requirement to protect, and carefully handle, the optical fiber exiting the composite structure.

The optic fibers 20 discussed above also provide a useful sensor 26 for detecting the state of the composite material matrix during the curing of the composite member. As initially infused into the composite material, the matrix is typically a liquid having a first index of refraction. After curing, the matrix is a solid material having another index of refraction. In between being infused and fully cured, the matrix exhibits a gradual change in its index of refraction. Thus, as the cure proceeds, the unclad fiber 20 loses a varying amount of light due to the changing index of refraction of the matrix curing around the cable. If light is transmitted through the cable 20 during the curing process the portion of the transmitted light exiting the optical fiber 20 therefore indicates how far the cure has progressed. Further because one, or more, optical fibers 20 may be distributed through the composite material (with, or without, temperature sensors formed therein), the entire member being cured may be monitored with the fiber optic system as opposed to using a large number of thermocouples. Preferably, a demodulator 22 of the present embodiment is selected that survives and operates adequately at, and above, the cure pressure (e.g. about 150 psi) and temperature (e.g. about 400 degrees Fahrenheit) of the composite material. Accordingly, the present system simplifies the instrumentation system required in the autoclave used to cure the composite member.

Figure 3:
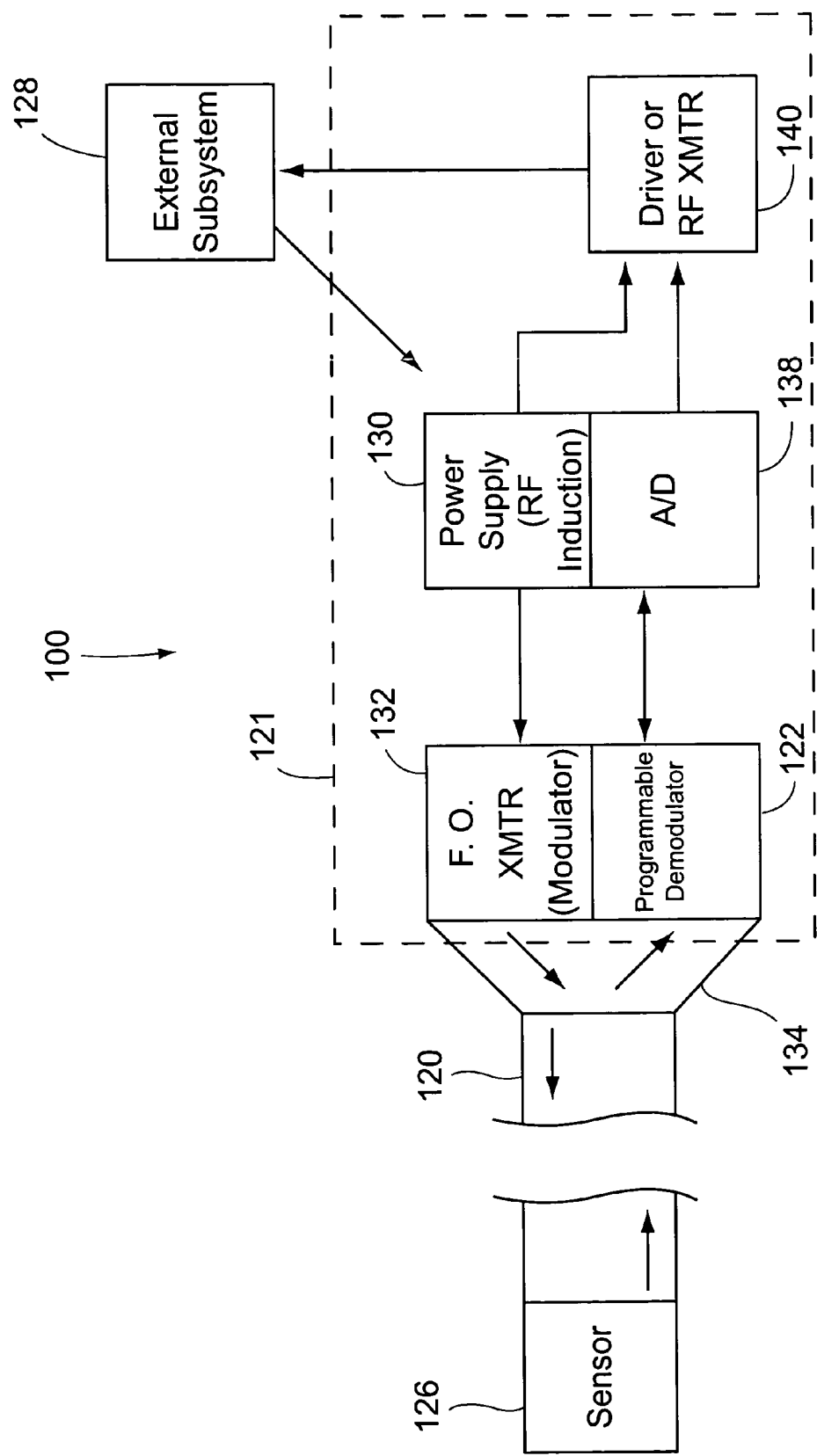
FIG. 3 illustrates a block diagram of a structural health monitoring subsystem in accordance with another preferred embodiment of the present invention.

Turning now to FIG. 3, a block diagram of a preferred embodiment of the present invention is illustrated. As shown, a fiber optic system 100 includes an optical fiber 120, a photonic unit 121 (including at least a demodulator), a sensor 126, and an external power supply and data subsystem 128. The sensor 126 is associated with the optical fiber 120 and may be any type of fiber optic sensor otherwise conventionally employed to monitor the health of a composite member. Exemplary sensors include those for sensing strain, temperature, acoustic emissions, and vibration by techniques known in the art (e.g. Bragg gratings, Fabry-Perot etalons, or interferometers). It will also be understood that multiple sensors may be distributed along the cable 120 without departing from the scope of the present invention. Several exemplary sensors 126 are described by commonly owned U.S. Pat. Nos. 4,471,659, 4,668,093, 5,380,995, 5,563,967, 5,627,927, and 6,204,920 the contents of which are incorporated herein as if set forth in full. The cable 120 is coupled to the photonic unit 121 for guiding light into, and out of, the cable 120. The external data subsystem 128 is shown as the only component of the system 100 external to the composite member and communicates with the embedded photonic unit 121 to supply power thereto and to receive signals therefrom.

Within the photonic unit 121, FIG. 3 shows an internal power supply 130, a fiber optic transmitter 132, an optical coupler 134, a demodulator 136, an analog-to-digital converter 138, and a signal driver 140. The power supply 130 communicates with the external subsystem 128 to receive energy therefrom and is connected to those components of the demodulator 122 that consume power, such as the fiber optic transmitter 132. The fiber optic transmitter 132 is optically coupled to the optical fiber 120 via the coupler 134. The coupler 134 also optically couples the sensor 126 to the demodulator 136 (via the cable 120). Further, FIG. 3 shows the analog-to-digital converter 138 in series with the demodulator 136 and the driver 140. In turn, the driver 140 is shown communicating with the external subsystem 128. It will be understood that the system 100 may also include additional fibers and photonic units 100 networked together.

In one preferred embodiment, the external subsystem 128 supplies power directly to the photonic unit 121 via a jack or other removable connecting device, thus enabling the power supply 130 to be quite simple, or even unnecessary. In another preferred embodiment, the power supply 130 accepts RF energy from the external subsystem 128 (via an antenna typically fabricated from a coil of copper wire), thereby eliminating the jack. Thus, the power supply 130 of the present invention contains circuitry for converting the RF energy to direct voltage current for powering the photonic unit 121. Such RF induction circuits are well known and include examples such as those commonly found in radio frequency identification (RFID) tags. Such RFID tags also include RF transmitters suitable for use as the driver 140, as will be discussed further herein. In another preferred embodiment, the power supply 130 includes a piezo electric transducer that converts the alternating strains, imposed on it by vibration of the structure, to an electric voltage. In turn, the voltage is used to power the photonic unit 121.

The fiber optic transmitter 132 includes a light source suitable for exciting the sensor 126. Exemplary light sources include, but are not limited to, light emitting diodes, laser diodes, and vertical cavity surface emitting lasers (VC-SELs). The demodulator 122 includes a photodiode, spectrometer, Michelson interferometer, or other light sensitive devices suitable for receiving the light (as altered, or modulated, by the sensor 126) and converting the same into one, or more, electric signals. Preferentially, the transmitter 132 and demodulator 136 are fabricated on a single, photonic, integrated circuit (IC) chip to minimize their combined envelope and to facilitate optical coupling between the chip and the coupler 134. Preferably, the sensor 126, the transmitter 132, and the demodulator 136 are selected together to sense a particular condition within the composite member. Thus, the demodulator 136 may be simplified to include only those sensing functions called for by a particular sensor 126. In other words, the demodulator 136 may include a reduced set of functions to minimize the size, cost, and power consumption of the chip in a manner similar to RISC (reduced instruction set computer) processor chips. Though, in accordance with the principles of the invention, the analog-to-digital converter 138 and the driver 140 may also be fabricated on the chip along with the transmitter 132 and demodulator 136. Similarly, a single photonic chip preferably accommodates a variety of sensors associated with the fiber 120. They may also be embedded separately in similar physical packages as described herein.

The analog-to-digital converter 138 is preferably included in the photonic unit 121 to digitize the analog signal generated by the demodulator 136 in a manner well known in the art. In either analog or digital form, FIG. 3 shows the demodulated signal as being communicated to the external subsystem 128 by the driver 140. Preferably the driver 140 is an RF transmitter or an amplifier suitable for driving the demodulated signal to the external subsystem 128 via a jack or other conductive path. Also, a unique identifier, model number, and serial number of the photonic unit 121 may accompany the demodulated signal to enable identification of, and interpretation of, the demodulated signal. In embodiments providing a jack to transfer power to the demodulator and to receive data therefrom, the jack is preferably located flush with one of the surfaces of the composite member at a locally planar location thereon. In particular, the unfinished surface of the composite member is a preferred location for the jack.

Thus, in operation the external subsystem 128 supplies power to drive the fiber optic transmitter 132. Light (e.g. ultraviolet, visible, or infrared) from the transmitter 132 is coupled into the optical fiber 120 by the coupler 134 for exciting the sensor 126. Light returning from the sensor 126 has impressed thereon a modulated signal representative of the condition sensed by the sensor 126. The modulated light exits the cable 120 at the coupler 134 and is directed to the demodulator 136 by the coupler 134. The demodulator 136 converts the modulated light signal from the sensor 126 to an electric signal representative of the sensed condition and communicates the signal to the analog-to-digital converter 138. From the converter 138, the digital signal is shown being communicated to the external subsystem 128 by the driver 140. The demodulated signal is then preferably interpreted by an operator or an autonomous system.

Figure 4:
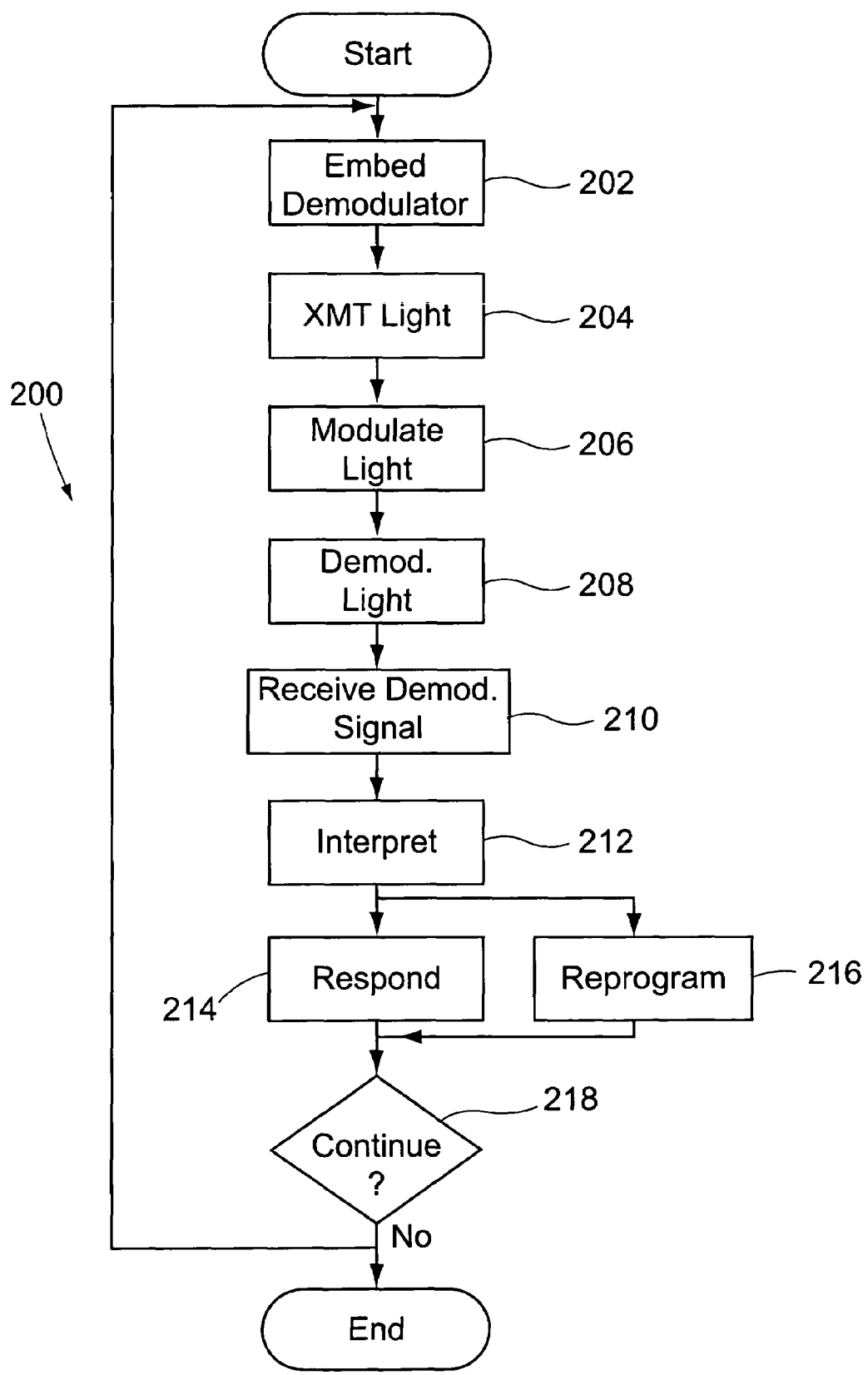
FIG. 4 illustrates a method in accordance with another preferred embodiment of the present invention.

With reference now to FIG. 4, a method in accordance with another preferred embodiment of the present invention is illustrated. The method 200 includes embedding a compact fiber optic demodulator and optical fiber in a composite member as shown by operation 202. Light is transmitted through the optical fiber in operation 204 and modulated by the sensor in operation 206. The embedded demodulator then demodulates the modulated light from the sensor to extract a signal representative of the condition being sensed. See operation 208. The embedded demodulator, or a device associated therewith, transmits the demodulated signal to a receiver that is located external to the composite member as in operation 210. The operator may accomplish the receipt of the demodulated signal by using appropriate support equipment (e.g. a receiver which includes an RF antenna or a male portion of a jack). In the alternative, the receipt may be accomplished via a receiver onboard the composite member or a larger assembly (e.g. aircraft) of which the composite member is a component part. In operation 212, either an automated system or the operator interprets the demodulated signal to determine the condition of the composite member. If maintenance activity is called for, the operator responds with appropriate inspections, repairs, or preventative activity in operation 214. In the alternative, the operator may choose to continue monitoring the condition if the condition does not warrant immediate action.

If the condition indicates that the demodulator ought to be re-programmed to optimize its performance, then the operator reprograms the demodulator in operation 216. An exemplary condition that calls for re-programming occurs when damage to the composite material causes severance of the optical fiber (e.g. a low velocity impact results in subsurface delamination of the composite, the repair of which typically severs the cable). In such situations the demodulator may be reprogrammed (i.e. recalibrated) to account for the shortened length of the fiber. In the alternative, if the optical cable connects the demodulator and sensor in a loop, the demodulator can be re-programmed to sense the altered light coming from the undamaged side of the loop. If continued monitoring of the sensor is desired, the method repeats as in operation 218. Otherwise, the system 100 can be turned off to save power. Because the demodulator used in the method is embedded in the composite member, operations 204 to 208 (in particular) may occur within the composite member, whereas operations 210 to 216 occur externally to the composite member.

In still another preferred embodiment, the method includes actively interrogating the structure to determine its health using an optic fiber and demodulator embedded in the structure. Active interrogation involves measuring a strain of the structure which is induced with a load or a piezoelectric actuator. For applications involving exciting the structure with the piezoelectric actuator, the actuator may be mounted to the structure or part of the maintenance support equipment. For aircraft structures, the active interrogation generally occurs while on the ground (e.g. at a maintenance depot). In yet another preferred embodiment the structure is passively interrogated (for example, continuously during flight for aircraft) using operationally induced loads on the structure and an optical fiber and demodulator embedded in the structure.

In view of the foregoing, it will be seen that the several advantages of the invention are achieved and attained. A lightweight and low-cost structural health monitoring system has been provided. In particular, the apparatus and methods provided eliminate the fragile optical fiber egress otherwise required to monitor the SHM sensors. Thus, composite fabrication tools and handling are minimized and manufacturing expenses reduced accordingly. Moreover, monitoring the sensors in accordance with the present invention does not require physical access to the sensors, the optical fiber, or the demodulator. As a result, the systems provided are durable and have longer operating lives while requiring less maintenance. Further, the reprogrammable features provided by the present invention increase flexibility, in particular with regard to upgrading SHM systems to the latest available technologies (e.g. new demodulation algorithms).

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A composite material comprising:
    a plurality of laminated layers defining a surface portion generally parallel to the laminated layers and an edge portion generally perpendicular to the laminated layers and where the composite material is to be trimmed;
    an optical fiber embedded in the composite material; and
    a fiber optic demodulator embedded in the composite material and optically coupled to the optical fiber, the fiber optic demodulator to demodulate electromagnetic radiation to be transmitted through the optical fiber.

2. The composite material according to claim 1, further comprising an electrical path between the fiber optic demodulator and the surface to conduct an electrical signal representative of the demodulated electromagnetic radiation.

3. The composite material according to claim 1, further comprising a transmitter embedded in the composite material, communicating with the demodulator, and to transmit an electromagnetic signal representative of the demodulated electromagnetic radiation.

4. The composite material according to claim 1, further comprising a fiber optic transmitter embedded in the composite material, optically coupled to the optical fiber, and to transmit the electromagnetic radiation into the optical fiber.

5. The composite material according to claim 1, further comprising an analog to digital converter embedded in the composite material, communicating with the demodulator, and to convert a signal representative of the demodulated electromagnetic radiation to a digital signal representative of the demodulated electromagnetic radiation.

6. The composite material according to claim 1, further comprising a sensor of the optical fiber for sensing a condition of the composite material.

7. The composite material according to claim 6, wherein the condition is at least one of a strain, a temperature, a response frequency, an acoustic emission, and a pressure.

8. The composite material according to claim 1, wherein the optical fiber further comprises a cladding.

9. The composite material according to claim 1, further comprising a generally planar configuration.

10. The composite material according to claim 1, further comprising being filament wound.

11. The composite material according to claim 1, the fiber optic demodulator further comprising an envelope not exceeding about 0.03 inches by about 0.50 inches by about 0.50 inches.

12. The composite material according to claim 1, further comprising the demodulator having a thermal coefficient of expansion about equal to a thermal coefficient of expansion of the composite material.

13. The composite material according to claim 1, the demodulator further comprising a surface adhering to a matrix of the composite material.

14. The composite material according to claim 1 wherein the demodulator is programmable.

15. The composite material according to claim 1, further comprising the demodulator being at least one of inductively powered by electromagnetic energy transmitted into the composite material and powered by a piezo-electric transducer coupled to the composite material.

16. The composite material according to claim 1, further comprising being adapted for use on a mobile platform.

17. The composite material according to claim 16, wherein the mobile platform is an aircraft.

18. A method of monitoring the health of a structural member, the member including a composite material including an optical fiber through which electromagnetic radiation is transmitted, comprising:
   demodulating the electromagnetic radiation from the optical fiber using a demodulator embedded in the composite material;
   receiving a signal representative of the demodulated electromagnetic radiation; and
   interpreting the signal as a condition of the composite material.

19. The method according to claim 18, the receiving further comprising conducting the signal.

20. The method according to claim 18, the receiving further comprising using an antenna.

21. The method according to claim 18, wherein the condition is at least one of a strain, a temperature, a response frequency, an acoustic emission, and a matrix cure status.

22. The method according to claim 18, further comprising determining whether to at least one of continue to monitor, repair, and replace the member based on the condition.

23. The method according to claim 18, further comprising re-programming the demodulator.

24. The method according to claim 23, wherein the re-programming further comprises responding to a change in the condition.

25. The method according to claim 18, further comprising powering the demodulator with electromagnetic energy transmitted into the composite material.

* * * * *